United States Patent
Ikeda et al.

(10) Patent No.: US 11,285,974 B2
(45) Date of Patent: Mar. 29, 2022

(54) VEHICLE CONTROL SYSTEM AND VEHICLE

(71) Applicant: HONDA MOTOR CO., LTD., Tokyo (JP)

(72) Inventors: Masaya Ikeda, Wako (JP); Takafumi Hirose, Wako (JP); Kentaro Ishisaka, Wako (JP); Takashi Watanabe, Wako (JP); Junpei Yashima, Wako (JP); Katsuya Yashiro, Wako (JP); Toru Kokaki, Wako (JP); Daiki Nishida, Wako (JP); Yuta Takada, Tokyo (JP); Yuji Fujiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 16/811,193

(22) Filed: Mar. 6, 2020

(65) Prior Publication Data
US 2020/0307643 A1 Oct. 1, 2020

(30) Foreign Application Priority Data
Mar. 27, 2019 (JP) .............................. JP2019-061303

(51) Int. Cl.
*G08G 1/0962* (2006.01)
*B60W 60/00* (2020.01)
(Continued)

(52) U.S. Cl.
CPC ........ *B60W 60/0054* (2020.02); *B60W 40/08* (2013.01); *B60W 60/0016* (2020.02);
(Continued)

(58) Field of Classification Search
CPC .......... G06K 9/00838; G06K 9/00845; B60W 50/0205; B60W 60/00; B60W 40/08;
(Continued)

(56) References Cited

U.S. PATENT DOCUMENTS

| 2016/0202700 A1* | 7/2016 | Sprigg | G05D 1/0088 701/23 |
| 2019/0031202 A1* | 1/2019 | Takeda | B60T 8/171 |
| 2020/0290601 A1* | 9/2020 | Yamanaka | B60W 50/0205 |

FOREIGN PATENT DOCUMENTS

| CN | 1576087 A | * 2/2005 | ............. B60K 35/00 |
| CN | 106164799 A | * 11/2016 | ........... G07C 5/0825 |

(Continued)

*Primary Examiner* — Yuri Kan
(74) *Attorney, Agent, or Firm* — Thomas | Horstemeyer, LLP

(57) ABSTRACT

A vehicle control system includes a vehicle, an information terminal apparatus that can provide, on a display unit, a plurality of contents which provide training on an operation method of the vehicle, and a server that can communicate with the vehicle and the information terminal apparatus. The information terminal apparatus includes a display control unit configured to cause the display unit to display a first content that provides training on an operation method including a method to start an operation of a specific function of the vehicle and a second content that provides, to a user of the vehicle who has been trained by the first content and is registered in the server, training on an operation method corresponding to a phenomenon that can occur while the specific function is provided.

16 Claims, 8 Drawing Sheets

(51) Int. Cl.
*B60W 40/08* (2012.01)
*H04W 4/44* (2018.01)
*G06V 20/59* (2022.01)

(52) U.S. Cl.
CPC ............ *G06V 20/593* (2022.01); *H04W 4/44* (2018.02); *B60W 2040/0809* (2013.01)

(58) Field of Classification Search
CPC ...... B60T 8/171; G05D 1/0088; G01C 21/34; G08G 1/0962; G07C 5/0825; B60K 35/00
See application file for complete search history.

(56) References Cited

FOREIGN PATENT DOCUMENTS

| | | | | |
|---|---|---|---|---|
| CN | 108701414 A | * | 10/2018 | ......... G06K 9/00845 |
| EP | 2979914 A2 | * | 2/2016 | ............ B60W 40/08 |
| JP | 2017-151704 A | | 8/2017 | |
| JP | 2017151704 A | * | 8/2017 | ........... G08G 1/0962 |
| WO | WO-2018235470 A1 | * | 12/2018 | ............. G01C 21/34 |

\* cited by examiner

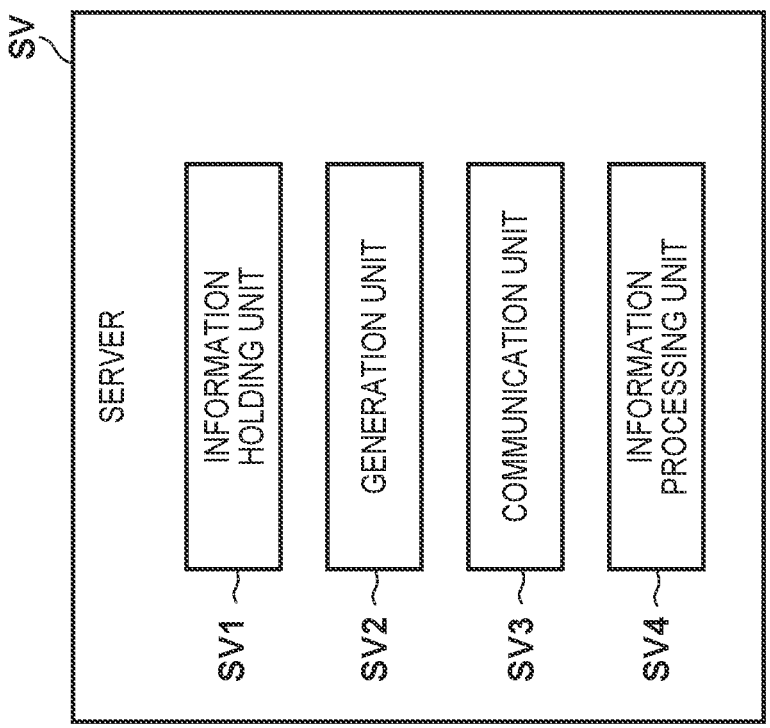
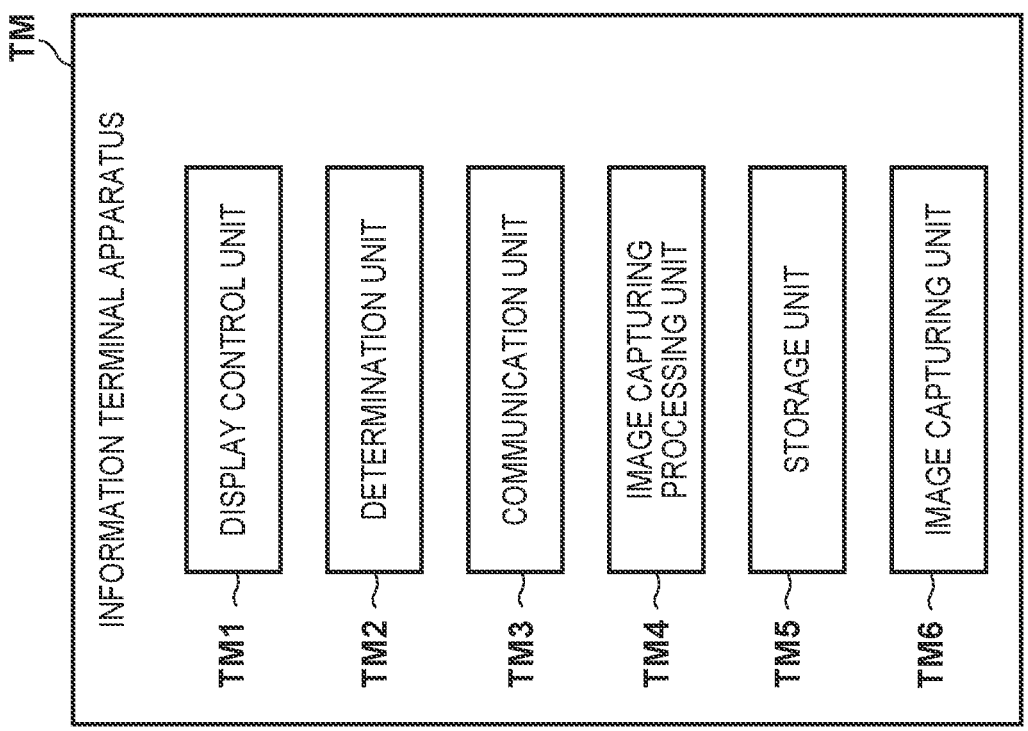

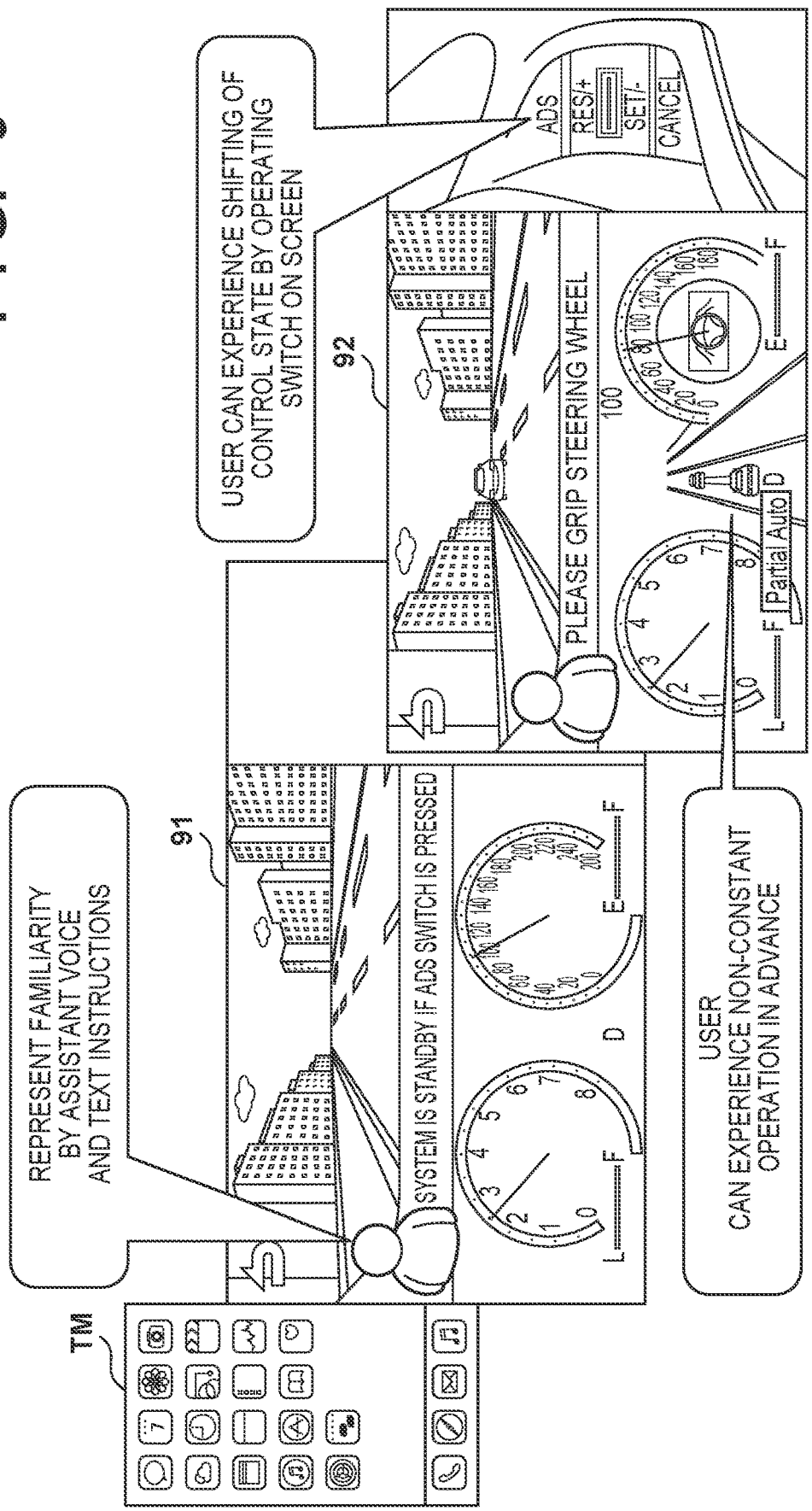

VEHICLE CONTROL SYSTEM AND VEHICLE

CROSS-REFERENCE TO RELATED APPLICATION(S)

This application claims priority to and the benefit of Japanese Patent Application No. 2019-061303 filed on Mar. 27, 2019, the entire disclosure of which is incorporated herein by reference.

BACKGROUND OF THE INVENTION

Field of the Invention

The present invention relates to a vehicle control system and a vehicle, and more specifically, to a vehicle control technique for controlling an automated driving vehicle.

Description of the Related Art

Japanese Patent Laid-Open No. 2017-151704 discloses an automated driving apparatus that gives a tutorial (guidance) on, among operations that the driver needs to perform when vehicle control is to be switched from automated driving control to manual driving, an operation which is desired and can be executed by a driver.

However, in order to provide a vehicle control function related to automated driving based on more advanced control, it is preferable to provide training on an operation method corresponding to the vehicle control function in advance, and cancel the function restriction so that vehicle control can be executed based on a more advanced control state when the user's understanding of the operation method has reached a predetermine level.

The present invention provides a technique that can train a user on an operation method of a specific function of a vehicle and cancel the function restriction on the user's vehicle so that vehicle control can be executed based on a more advanced control state when the user's understanding of the operation method has reached a predetermined level.

SUMMARY OF THE INVENTION

According to one aspect of the present invention, there is provided a vehicle control system comprising a vehicle, an information terminal apparatus that can provide, on a display unit, a plurality of contents which provide training on an operation method of the vehicle, and a server that can communicate with the vehicle and the information terminal apparatus, wherein the information terminal apparatus comprises a display control unit configured to cause the display unit to display a first content that provides training on an operation method including a method to start an operation of a specific function of the vehicle and a second content that provides, to a user of the vehicle who has been trained by the first content and is registered in the server, training on an operation method corresponding to a phenomenon that can occur while the specific function is provided, a determination unit configured to determine a viewing result of the second content based on an input from the user, and a transmission unit configured to transmit a determination result of the determination unit to the server, the server comprises a generation unit configured to generate, based on the determination result of the determination unit, cancellation information for canceling a preset function restriction on the specific function of the vehicle, the vehicle comprises an obtainment unit configured to obtain authentication information for authenticating the user, and a vehicle control unit configured to perform authentication processing on the user based on the authentication information, and the vehicle control unit cancels the function restriction on the specific function based on a result of the authentication processing and the cancellation information.

According to another aspect of the present invention, there is provided a vehicle control system comprising a vehicle and an information terminal apparatus which can provide, to a display unit, a plurality of contents that provide training on an operation method of the vehicle, wherein the information terminal apparatus comprises a display control unit configured to cause the display unit to display a first content that provides training on an operation method including a method to start an operation of a specific function of the vehicle and a second content that provides, to a user of the vehicle who has been trained by the first content, training on an operation method corresponding to a phenomenon that can occur while the specific function is provided, a determination unit configured to determine a viewing result of the second content based on an input from the user, and a generation unit configured to generate, based on a determination result of the determination unit, cancellation information for canceling a preset function restriction on the specific function of the vehicle, the vehicle comprises an obtainment unit configured to obtain authentication information for authenticating the user, and a vehicle control unit configured to perform authentication processing on the user based on the authentication information, and the vehicle control unit cancels the function restriction on the specific function based on a result of the authentication processing and the cancellation information.

According to another aspect of the present invention, there is provided a vehicle comprising: a display control unit configured to cause a display unit to display a first content that provides training on an operation method including a method to start an operation of a specific function of the vehicle and a second content that provides, to a user of the vehicle who has been trained by the first content, training on an operation method corresponding to a phenomenon that can occur while the specific function is provided, a determination unit configured to determine a viewing result of the second content based on an input from the user, a generation unit configured to generate, based on a determination result of the determination unit, cancellation information for canceling a preset function restriction on the specific function of the vehicle, an obtainment unit configured to obtain authentication information for authenticating the user, and a vehicle control unit configured to perform authentication processing on the user based on the authentication information, wherein the vehicle control unit cancels the function restriction on the specific function based on a result of the authentication processing and the cancellation information.

According to the present invention, training related to an operation method of a specific function of a vehicle can be performed, and the function restriction on the user's vehicle can be canceled so that vehicle control can be executed in a more advanced control state when the user's understanding of the operation method has reached a predetermined level.

BRIEF DESCRIPTION OF THE DRAWINGS

The accompanying drawings, which constitute a part of the specification, illustrate embodiments of the invention and, together with the description, serve to explain the invention.

FIG. 2 is a block diagram showing the basic arrangement of an information terminal apparatus;

FIG. 3 is a block diagram showing the basic arrangement of a server;

FIG. 9 is a view showing a display example of a first content and a second content.

DESCRIPTION OF THE EMBODIMENTS

Figure 1:
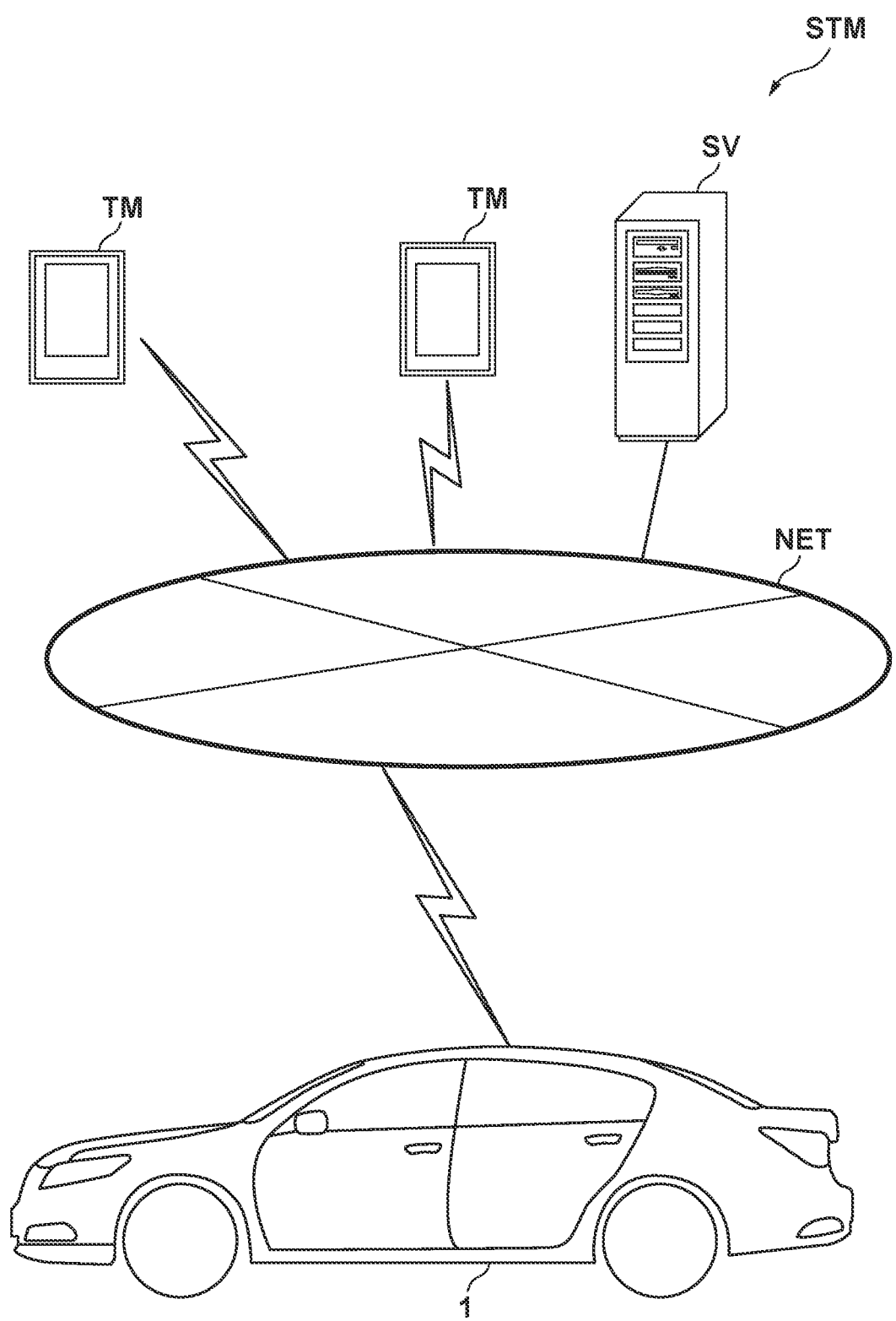
FIG. 1 is a view showing the basic arrangement of a vehicle control system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment (Arrangement of Vehicle Control System)

FIG. 1 is a view showing an example of the basic arrangement of a vehicle control system STM. The vehicle control system STM includes a vehicle 1, information terminal apparatuses TM, and a server SV. Each information terminal apparatus TM can provide, to a display unit, a plurality of contents that provide training on the operation method of the vehicle 1. The server SV can also communicate with the vehicle 1 and each information terminal apparatus TM, and holds information of the vehicle 1 and the user in an internal information holding unit (SV1 shown in FIG. 3). The information holding unit SV1 of the server SV may be arranged as a storage device on a network (cloud) NET.

Each information terminal apparatus TM can be formed by, for example, a portable terminal (a tablet-type PC, a smartphone, or the like) possessed by the user or by an information terminal arranged at a site (a car dealership) where the vehicle 1 is sold or undergoes maintenance.

(Arrangement of Information Terminal Apparatus TM)

FIG. 2 is a block diagram showing the basic arrangement of the information terminal apparatus TM. The information terminal apparatus TM includes, as a functional component, a display control unit TM1 that can cause a display unit to display a first content, which provides training on an operation method including a method for starting the operation of a specific function of the vehicle 1, and a second content, which provides training on an operation method of a more advanced level of training than the first content to the user of the vehicle 1 who has already been trained by the first content and is registered in the server. FIG. 9 is a view showing a display example of the first content and the second content displayed on a display unit of the display control unit TM1 based on the display control by the display control unit TM1. A screen display 91 is an example of display provided by the first content, and a screen display 92 is an example of display provided by the second content.

The display control unit TM1 causes the display unit of the information terminal apparatus TM to display, as the first content, a content that provides training on the operation method of a specific function (a function related to vehicle control in automated driving). In the first content, the display control unit TM1 provides training (a tutorial) on an operation method which explains a specific function of the vehicle 1 by offering an instruction by a combination of text and voice of a character (training assistant) displayed on the screen. The user can view the first content to experience the operation method of automated driving of the vehicle 1.

The display control unit TM1 also causes the display unit to display, as the second content, a content that provides training on operation methods corresponding to phenomena that can occur while the specific function is provided. The second content can be, for example, various examples of cases that can occur in the vehicle 1 while traveling based on the automated driving function. For example, the display control unit TM1 simulates and reproduces states that can occur while changing (shifting) the control state of the vehicle 1 and causes the display unit to display these states, for example, a guidance of tasks, such as a request to grip a steering wheel, a request to take a driving posture for peripheral monitoring, or the like, requested to a driver when the control state of the vehicle 1 is to be shifted sequentially, a guidance of task requested in relation to peripheral monitoring, a vehicle control state to be shifted when there is no response from the driver to a given guidance, or the like.

As a prerequisite for viewing the second content, the user must have already viewed the first content (undergone training by the first content) and have completed the contract to purchase the vehicle 1. The information of the user who has completed the contract is stored in the server SV, and the display control unit TM1 can communicate with the server SV to determine whether the user has completed the contract.

The display control unit TM1 determines whether the user who has been trained by the first content is registered in the server SV. The display control unit TM1 permits the second content to be displayed to a user who is registered in the server SV, and restricts the second content from being displayed to a user who is not registered in the server SV.

That is, when the user has been trained by the first content and is registered in the server SV, the display control unit TM1 will cause the display unit to display the second content which provides training on an operation method of a more advanced training level than the first content. The user can view the second content to experience a more advanced operation method related to the automated driving of the vehicle 1.

The information terminal apparatus TM also includes, as functional components, a determination unit TM2 which determines the result of the user's viewing of the second content based on the user's input, and a communication unit TM3 which transmits the determination result by the determination unit TM2 to the server SV.

To determine the result of the user's viewing of the second content, the determination unit TM2 causes the display unit to display confirmation information for confirming the training contents of the second content to determine whether the confirmation result input by the user is equal to or more than a reference value. To confirm the understanding of the user who has viewed the second contents, the determination unit TM2 presents the confirmation information on the display unit. If it is determined that the confirmation result is equal to or more than the reference value, the determination unit TM2 will generate training completion information which indicates that the training by the second content has been completed.

The communication unit TM3 will transmit the training completion information indicating that the training by the second content has been completed to the server SV.

In addition, to determine the result of the viewing of the second content, the determination unit TM2 can cause the display unit to display an operation input portion (an icon) for the user to confirm the viewing after the viewing of the second contents has been completed (after the playback has ended), and determine the user's viewing result in accordance with whether the user makes an input.

The information terminal apparatus TM further includes, as functional components, an image capturing unit TM6 (for example, an internal camera) for capturing an image of the user while he/she is viewing the plurality of contents (the first content and the second content) and an image capturing processing unit TM4 for processing the image captured by the image capturing unit TM6. The image capturing processing unit TM4 obtains image information (for example, a facial image) of the user by processing an image captured by the image capturing unit TM6.

Other than the facial information, the image information of the user here includes appearance information, such as the direction of the face, the line of sight, the posture at the time of viewing, the degree to which the eyes (the eyelids) are open/closed, the length of time in which the lids are closed, and the like, of the user while he/she is viewing the contents (the first content and the second content). Note that the image of the user captured by the image capturing unit TM6 is not limited to the image of the user when he/she is viewing the plurality of contents (the first content and the second content) and includes the image information of the user obtained after the playback of each content has been completed.

The determination unit TM2 obtains the degree of alertness of the user based on the appearance information of the user obtained from the image processing by the image capturing processing unit TM4. For example, the degree of alertness of the user will be determined to be low when the degree to which the user's eyelids are open is small or when the length of time in which the user's eyelids are closed is long. If the degree of alertness of the user, which has been obtained based on the appearance information of the user, is equal to or more than a predetermined threshold which serves as a reference, the determination unit TM2 will determine that the user has viewed the second content under a predetermined degree of alertness, and generate the training completion information.

If it is determined that the second content has been viewed by the user under a predetermined degree of alertness, the communication unit TM3 will transmit the training completion information which indicates the completion of the training by the second content. When the determination result (for example, the training completion information) of the determination unit TM2 is to be transmitted to the server SV, the communication unit TM3 will combine the training completion information and the user's image information for specifying the user and transmit the combined pieces of information to the server SV.

The information terminal apparatus TM can be formed in the user's terminal apparatus (a tablet-type PC, a smartphone, or the like) or as a terminal apparatus arranged at a site (car dealership) where the vehicle 1 is sold or undergoes maintenance. The user can view each content on either terminal apparatus.

The first content and the second content need not be viewed by using the same information terminal apparatus TM. For example, the user can view the first content on the terminal apparatus arranged in a site (car dealership) and view the second content on his/her smartphone after the contract has been completed.

Other than this, the user may initially view the first content on his/her smartphone and subsequently view the second content on the terminal apparatus arranged in the site (car dealership). The information of the user's viewing history of each content is stored in a storage unit TM5 and can be managed within the information terminal apparatus TM. In addition, the information of the user's viewing history information can be shared with another information terminal apparatus TM and the server SV on the network NET.

(Arrangement of Server SV)

FIG. 3 is a block diagram showing the basic arrangement of the server SV. The server SV includes, as functional components, the information holding unit SV1 which holds information associating the user and the vehicle 1 and a generation unit SV2 which generates cancellation information for canceling the preset function restriction on the vehicle based on the training completion information transmitted from the information terminal apparatus TM.

The server SV also includes a communication unit SV3 which outputs the cancellation information generated by the generation unit SV2. The communication unit SV3 can transmit the cancellation information to the vehicle 1 registered in the server SV or the information terminal apparatus TM. In this case, the cancellation information generated by the generation unit SV2 includes specification information for specifying the user. The specification information for specifying the user includes, for example, the user's image information (for example, the facial image) obtained by capturing the user.

An information processing unit SV4 of the server SV can perform various kinds of information processing based on the information obtained from the information terminal apparatus TM and a vehicle control apparatus 100 of the vehicle 1. For example, the information processing unit SV4 of the server SV can perform user authentication processing which is to be performed by a vehicle control unit C11 (to be described later).

In such a case, the information processing unit SV4 can perform the authentication processing by obtaining authentication information for authenticating the user (driver) from the side of the vehicle 1 and comparing the obtained authentication information with the user's image information held in the server SV The communication unit SV3 of the server SV can transmit the authentication result to the vehicle 1 so that the vehicle control unit C11 can use the authentication result obtained from the server SV to perform processing to cancel the restriction on the function of the vehicle 1.

(Arrangement of Vehicle Control Apparatus)

Figure 4:
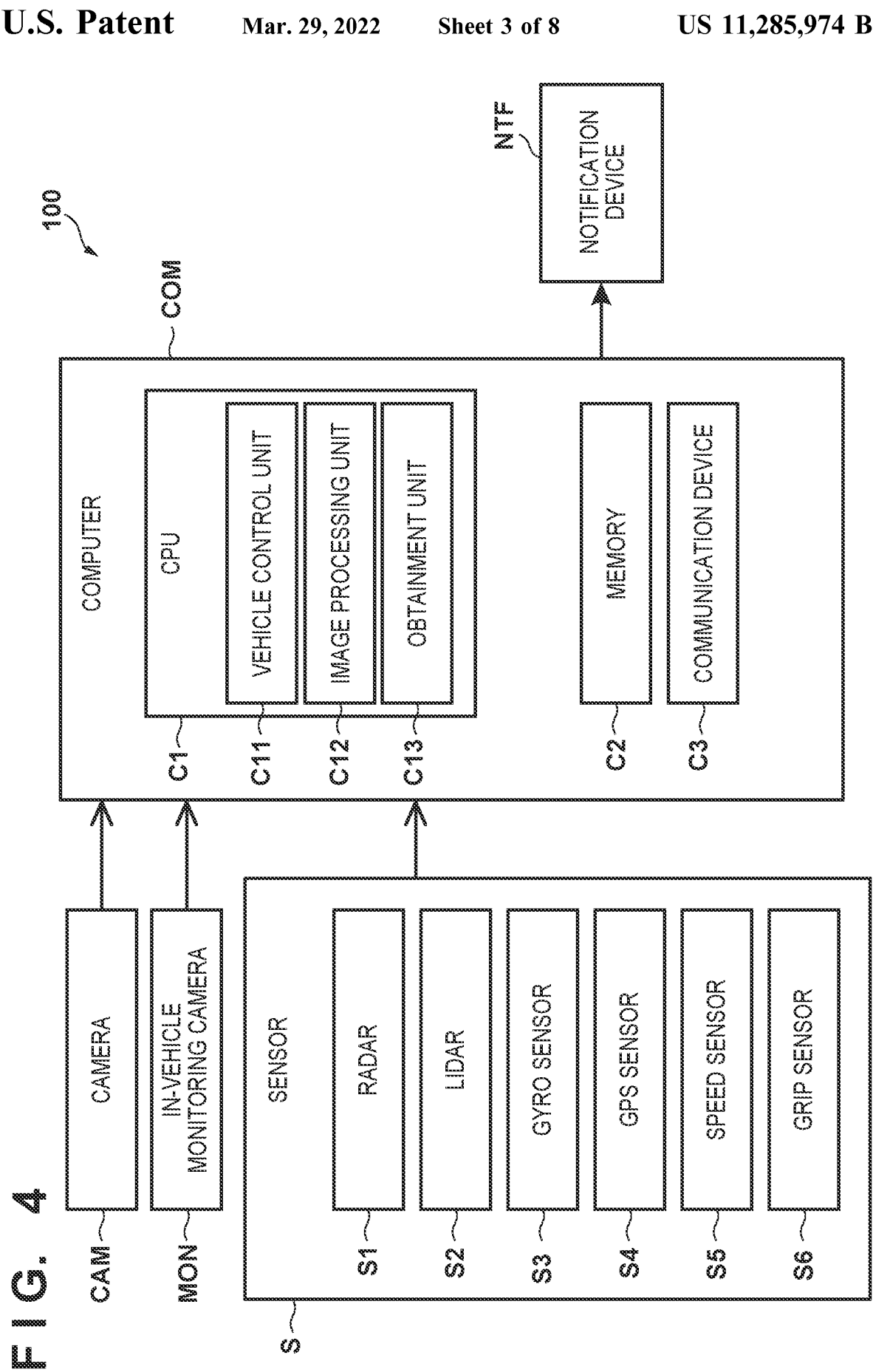
FIG. 4 is a block diagram showing the basic arrangement of a vehicle control apparatus.

FIG. 4 is a view showing an example of the arrangement of the vehicle control apparatus 100 that performs vehicle control of the vehicle 1. The vehicle control apparatus 100 connects to sensors S, a plurality of cameras CAM, and an in-vehicle monitoring camera MON, and includes a computer COM. The sensors S include, for example, a plurality of radars S1, a plurality of LiDARs (Light Detection and Ranging) S2, a gyro sensor S3, a GPS sensor S4, a speed sensor S5, a grip sensor S6, and the like.

The computer COM also includes a CPU C1 which is in charge of processing related to automated driving control of the vehicle, a memory C2, and a communication device C3 which is capable of connecting to the network NET and communicating with the server SV and the information terminal apparatus TM on the network NET, another vehicle positioned in the periphery of the vehicle (self-vehicle), and the like. The sensors S and the camera CAM will obtain various kinds of information of the vehicle and input the obtained information to the computer COM.

The CPU C1 of the computer COM performs image processing on image information input from the camera CAM. The CPU C1 extracts objects present in the periphery of the self-vehicle based on camera image information that has undergone image processing and sensor information input from the sensors S (the radars S1 and the LiDARs S2), analyzes what kind of objects are present in the periphery of the self-vehicle, and monitors the objects.

The gyro sensor S3 detects the rotary motion and the posture of the self-vehicle, and the computer COM can determine the track of the self-vehicle based on the detection result of the gyro sensor S3, the speed detected by the speed sensor S5, and the like. The GPS sensor S4 detects the current position (position information) of the self-vehicle in the map information.

The grip sensor S6 is, for example, incorporated in the steering wheel of the vehicle and can detect whether a vehicle occupant (driver) is gripping the steering wheel. The grip sensor S6 inputs the detected steering wheel grip information to the computer COM. The computer COM can determine, based on the steering wheel grip information input by the grip sensor S6, whether the vehicle occupant (driver) is gripping the steering wheel, that is, whether the steering wheel is currently in a "hands-on" state or a "hands-off" state.

The in-vehicle monitoring camera MON is arranged so as to be capable of capturing an image inside the vehicle, and captures an image of the vehicle occupant. The in-vehicle monitoring camera MON inputs, to the computer COM, the outer appearance information of the captured vehicle occupant. The computer COM can perform image processing on the image of the vehicle occupant input from the in-vehicle monitoring camera MON, and detect the number of vehicle occupants riding in the vehicle 1, the seating positions, and the outer appearance information of the vehicle occupant such as the expression, the facial direction, the line of sight, the degree of eye opening/closing, the driving posture, and the like of the vehicle occupant. The computer COM can determine, based on the detected outer appearance information of the vehicle occupant, whether the current driving state of the vehicle occupant (driver) is an "eyes-on" state or an "eyes-off" state.

A notification device NTF includes a voice output device and a display device. The voice output device notifies the driver of information by voice. The display device notifies the driver of information by displaying an image. The display device can be formed as, for example, a touch panel, display various kinds of messages from the computer COM to the user (the driver or an occupant), and accept an input operation from the user as a response to the various kinds of messages.

The computer COM of the vehicle control apparatus 100 can control the automated driving travel operation of the vehicle by causing the control state of the vehicle to shift in a plurality of control states based on the information of the peripheral environment of the vehicle. That is, the computer COM obtains peripheral environment information of the vehicle by using the information from the sensors S and the cameras CAM, shifts the control state of the vehicle based on the peripheral environment information, and controls the automated driving travel operation of the vehicle.

The CPU C1 of the computer COM functions as a vehicle control unit C11, an image processing unit C12, and an obtainment unit C13 by executing programs stored in the memory C2. The image processing unit C12 can perform image processing on an image of a vehicle occupant input from the in-vehicle monitoring camera MON. The obtainment unit C13 can obtain the authentication information for authenticating the user (driver) based on the in-vehicle image information obtained based on the image processing result from the image processing unit C12.

The communication device C3 can communicate with each information terminal apparatus TM and the server SV. When the communication device C3 receives, from the server SV, the cancellation information for canceling the function restriction of the vehicle, the vehicle control unit C11 can perform user authentication processing by comparing the authentication information obtained by the obtainment unit C13 and the user specification information included in the cancellation information. If the authentication information and the specification information match, the vehicle control unit C11 can cancel the preset function restriction of the vehicle 1 based on the cancellation information. The more specific processing performed by the vehicle control unit C11 and the obtainment unit C13 in relation to the authentication processing and the cancellation of the function restriction will be described later.

The vehicle control unit C11 controls the vehicle based on the detection results of the detection units (the sensors S, the cameras CAM, and the like) that detect the information of the vehicle and the peripheral information of the vehicle. The automated driving travel operation of the vehicle is controlled by one of the plurality of control states.

In a case in which the vehicle is to incorporate the vehicle control apparatus 100 shown in FIG. 4, the computer COM may be arranged in, for example, an ECU of recognition processing system that processes information of the sensors S, the cameras CAM, and the in-vehicle monitoring camera MON, an ECU of an image processing system, an ECU for controlling a communication device and an input/output device, an ECU in a control unit that executes vehicle driving control, or an ECU for automated driving. For example, as shown in FIG. 5 to be described below, the function of the computer COM may be distributed among a plurality of ECUs that form the vehicle control apparatus 100 such as the ECUs of the sensors S, the ECUs of the cameras, the ECU of the input/output device, the ECU for automated driving, and the like.

Figure 5:
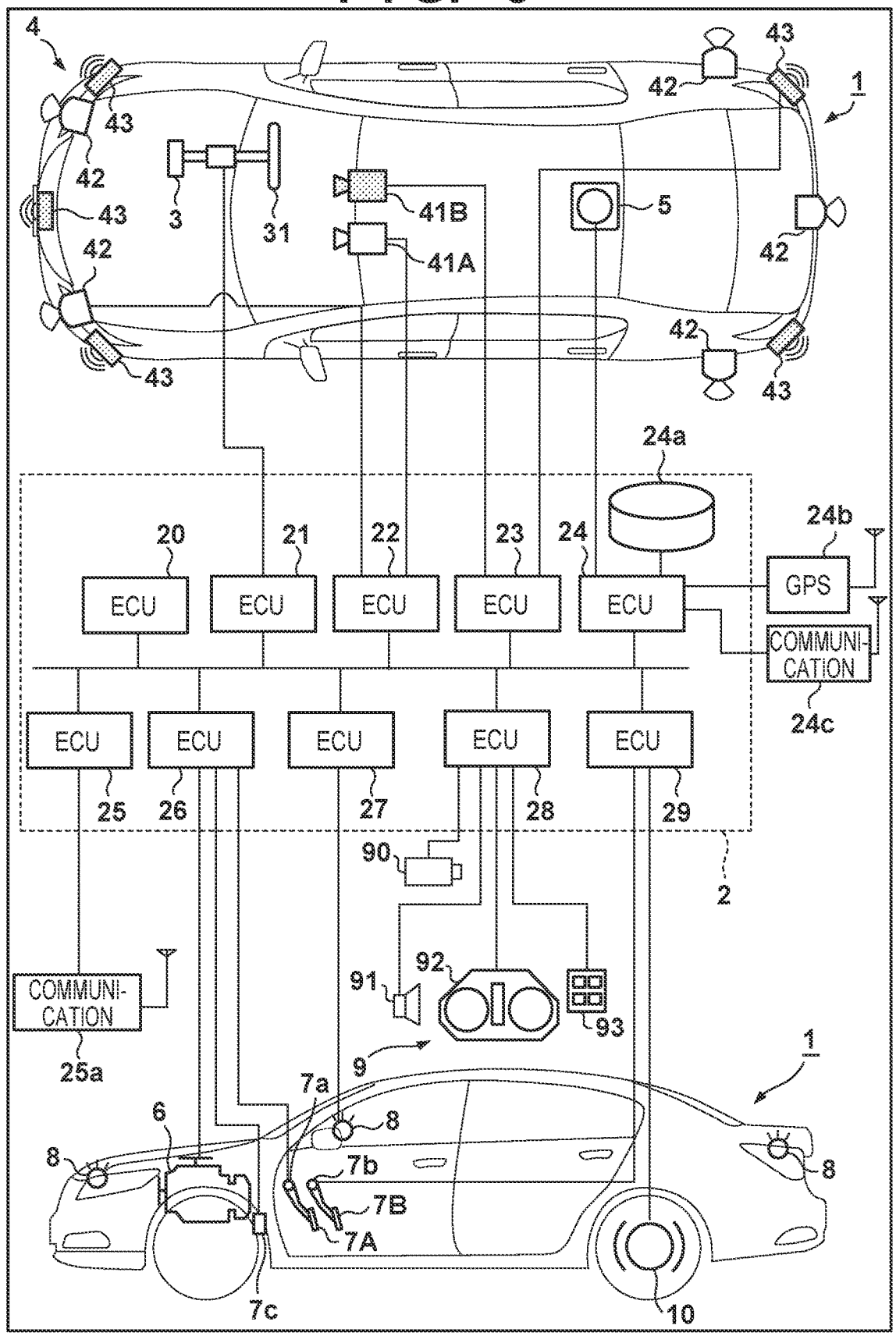
FIG. 5 is a view showing an example of the arrangement of a control block diagram for controlling a vehicle.

FIG. 5 is a view showing the arrangement example of a control block diagram of the vehicle control apparatus 100 for controlling the vehicle 1. The outline of vehicle 1 is shown by a plan view and a side view in FIG. 5. The vehicle 1 is, for example, a sedan-type four-wheeled vehicle.

A control unit 2 shown in FIG. 5 controls each unit of the vehicle 1. The control unit 2 includes a plurality of ECUs 20 to 29 communicably connected by an in-vehicle network. Each ECU (Electronic Control Unit) includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1 (self-vehicle) according to this embodiment. In automated driving, at least one of steering and acceleration/deceleration of the vehicle 1 is automatically controlled. Processing associated with more specific control related to automated driving will be described in detail later.

The ECU 20 performs vehicle travel control based on based on the position of the vehicle 1 (self-vehicle) showing the peripheral state of the vehicle, the relative positions of other vehicles present in the periphery of the vehicle 1, the information of the road on which the vehicle 1 is traveling, the map information, and the like.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 control detection units 41 to 43 that detect the peripheral state of the vehicle, and perform information processing of detection results. Detection units 41 are components corresponding to the cameras CAM of FIG. 4 and are image capturing devices (to be sometimes referred to as cameras 41A and 41B hereinafter) that perform image capturing to detect an object in the periphery of the vehicle 1. The cameras 41A and 41B are attached to the windshield inside the vehicle cabin at the front of the roof of the vehicle 1. The images captured by the cameras 41A and 41B can be analyzed (image processing) to extract, for example, the contour of an object in the periphery of the vehicle 1.

The detection unit 42 (LiDAR detection unit) is, for example, Light Detection and Ranging (LiDAR) (to be sometimes referred to as the LiDAR 42 hereinafter), and uses light to detect a target around the vehicle 1 or measures the distance to a target. The detection units 42 (LiDARs 42) are components corresponding to the LiDARs S2 of FIG. 4. In this embodiment, a plurality of LiDARs 42 are provided around the vehicle. In the example shown in FIG. 5, five LiDARs 42 are provided; one at each corner of the front portion of the vehicle 1, one at the center of the rear portion, and one on each side of the rear portion.

The detection unit 43 (radar detection unit) is, for example, a millimeter wave radar (to be sometimes referred to as the radar 43 hereinafter), and uses radio waves to detect a target around the vehicle 1 or measures the distance to a target. The detection units 43 (radars 43) are components that correspond to radars S1 of FIG. 4. In this embodiment, a plurality of radars 43 are provided around the vehicle. In the example shown in FIG. 5, five radars 43 are provided; one at the center of the front portion of the vehicle 1, one at each corner of the front portion, and one at each corner of the rear portion.

The ECU 22 controls one camera 41A and each LiDAR 42 and performs information processing of detection results. The ECU 23 controls the other camera 41B and each radar 43 and performs information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally. Note that the ECU 22 and the ECU 23 may be integrated into a single ECU.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server device that provides map information and traffic information and obtains these pieces of information. The ECU 24 can access a map information database 24a formed in the storage device. The ECU 24 searches for a route from the current position to the destination. The database 24a can be arranged on a network, and the communication device 24c can obtain information by accessing the database 24a on the network. The gyro sensor 5, the GPS sensor 24b, the communication device 24c are components that correspond to the gyro sensor S3, the GPS sensor S4, and the communication device C3, respectively, of FIG. 4.

The ECU 25 includes a communication device 25a for inter-vehicle communication. The communication device 25a performs wireless communication with another vehicle in the periphery and exchanges information between the vehicles. The ECU 25 can also exchange information between the information terminal apparatus TM and the server SV by controlling the communication between them.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the vehicle occupant (driver) detected by an operation detection sensor 7a provided on an accelerator pedal 7A, or switches the gear ratio of the transmission based on information such as a speed detected by a speed sensor 7c (the speed sensor S5 of FIG. 4). If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 5, the direction indicators 8 are provided in the front portion, door mirrors, and the rear portion of the vehicle 1.

The ECU 28 can control an input/output device 9 and perform image processing on the facial image of the driver input from an in-vehicle monitoring camera 90. The in-vehicle monitoring camera 90 in this case corresponds to the in-vehicle monitoring camera MON of FIG. 4. The input/output device 9 outputs information to the vehicle occupant (driver) and accepts settings from the driver. A voice output device 91 notifies the driver of the information by voice. A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification mode may be changed in accordance with the level (for example, the degree of urgency) of information of which the driver is to be notified. The voice output device 91 and the display device 92 correspond to, for example, the notification device NTF of FIG. 4 described above.

Although an input device 93 is a switch group that is used to issue an instruction to the vehicle 1 and arranged at a position where the driver can perform an operation, it may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stopped state of the vehicle 1.

[Plurality of Control States]

In this embodiment, vehicle control processes related to acceleration/deceleration, steering including the lane change operation, braking, and the like of the vehicle and tasks to be requested to the vehicle occupant (driver) are set in each of a plurality of control states. Tasks to be requested to the vehicle occupant include an operation requested to the vehicle occupant to be in correspondence with a vehicle periphery monitoring request, for example, gripping of the steering wheel ("hands-off" or "hands-on"), periphery monitoring ("eyes-off" or "eyes-on"), driving takeover, and the like.

The plurality of control states are classified into a plurality of levels in accordance with the degree of automation (automation rate) of vehicle control and the degree of tasks requested (the degree of the vehicle occupant's involvement in the operation of the vehicle) to the vehicle occupant (driver).

The vehicle control apparatus 100 can control the vehicle based on a plurality of control states. The vehicle control unit C11 can control the automated driving travel operation of the vehicle by one of the plurality of control states based on the information (external information) of the peripheral environment of the vehicle obtained from the LiDARs 42, the camera 41A, the radars 43, and the camera 41B, and the like.

(First Control State)

In this embodiment, a first control state is a control state in which a predetermined degree of automation (automation rate) and a predetermined degree of tasks requested (the degree of the vehicle occupant's involvement in the operation of the vehicle) to the vehicle occupant (driver) have been set for vehicle control. In the first control state, the main subject that drives the vehicle is the driver, and the driver needs to monitor the periphery and needs to grip the steering wheel.

(Second Control State)

In this embodiment, a second control state is a control state that has a higher vehicle control automation rate (degree of automation) or a lower degree of vehicle operation involvement requested to the driver than the first control state. In the second control state, the main subject that drives the vehicle is the driver, and the driver needs to monitor the periphery, but need not grip the steering wheel. The second control state is, for example, a control state that can be executed on the main lane of an expressway which is not congested.

(Third Control State)

A third control state is a control state that has a higher vehicle control automation rate (degree of automation) or a lower degree of vehicle operation involvement requested to the driver than the second control state. In the third control state, the main subject that drives the vehicle is the vehicle control apparatus 100 (vehicle system), and the driver needs to neither monitor the periphery nor grip the steering wheel.

The driver is, however, required to perform the vehicle system monitoring duty in preparation for a warning notification from the vehicle system. The third control state is a control state in which vehicle control can be performed in a travel lane of the vehicle 1 within a predetermined speed range for operating vehicle control, and is a control state that can be executed in, for example, a travel scene (TJP: Traffic Jam Pilot) in which the vehicle 1 (self-vehicle) follows a preceding vehicle which is traveling ahead of the self-vehicle in the main lane of a congested expressway.

(Procedure of Processing of Information Terminal Apparatus TM)

Figure 6:
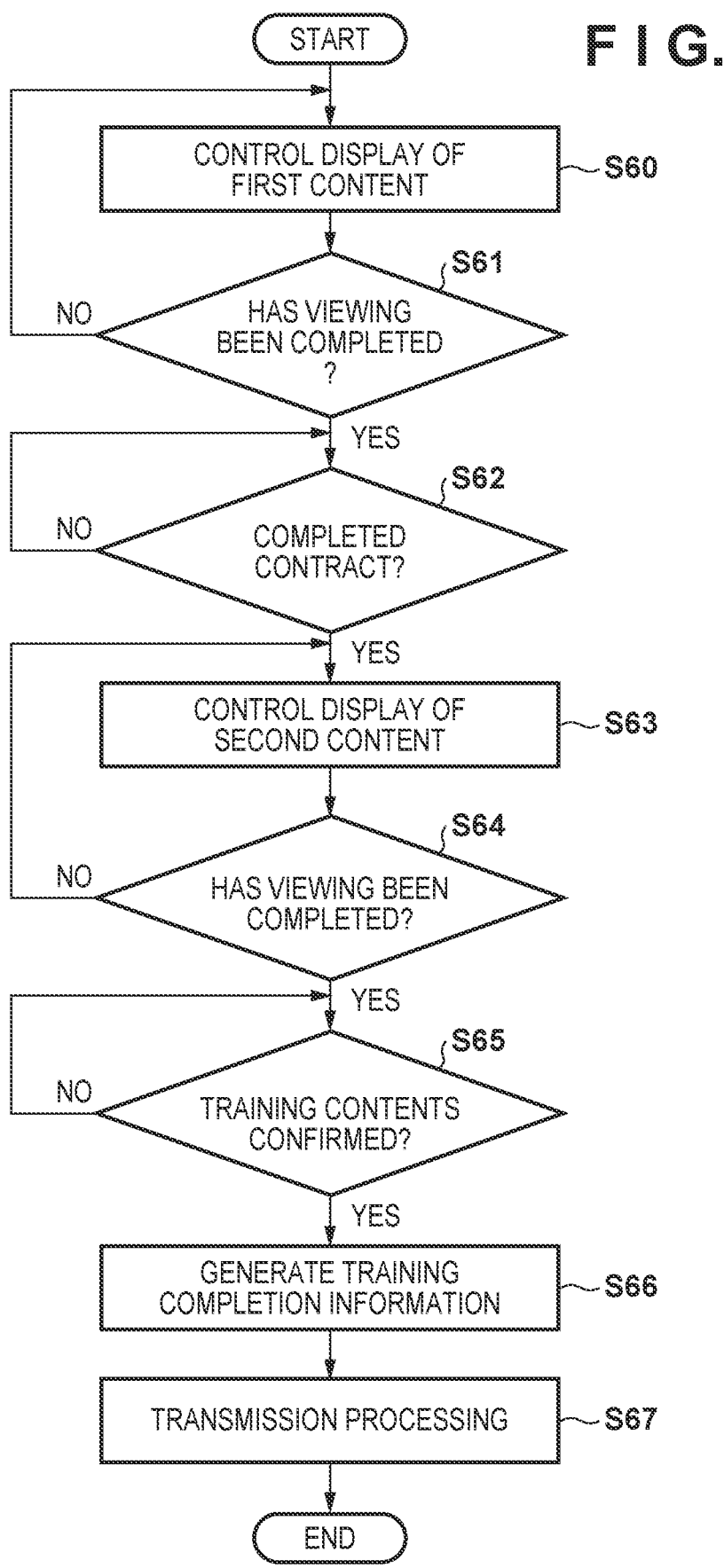
FIG. 6 is a flowchart for explaining a processing procedure of the information terminal apparatus.

FIG. 6 is a flowchart for explaining the procedure of processing performed in the information terminal apparatus TM. First, upon receiving a viewing request from the user, the display control unit TM1 performs control, in step S60, to display the first content that provides training on the operation method including a method for starting the operation of a specific function of the vehicle 1.

In step S61, the display control unit TM1 determines whether the viewing of the first content has been completed. If the user has not completed viewing the first content (NO in step S61), the process returns to step S60, and the same process is repeated. If the user is to suspend viewing midway, the display control unit TM1 can store the viewing history and perform display control so that the viewing of the first content can be restarted from the point where the user had suspended the viewing when the viewing is to be restarted.

If it is determined that the user has completed viewing the first content in the determination process of step S61 (YES in step S61), the display control unit TM1 will advance the process to step S62.

In step S62, the display control unit TM1 determines whether the user is the user who completed the contract to purchase the vehicle 1. The display control unit TM1 can communicate with the server SV to determine whether the user has completed the contract. If the contract has not been completed, that is, if the information of the user is not stored in the server SV, the display control unit TM1 will determine that it is in a contract incomplete state (NO in step S62), and will wait until the current state shifts to the contract complete state.

On the other hand, if it is determined that the user has completed the contract in the determination of step S62 (YES in step S62), the display control unit TM1 will advance the process to step S63.

In step S63, upon receiving a viewing request from the user, the display control unit TM1 will perform control to display the second content. The display control unit TM1 will perform display control to cause the display unit to display the second content that provides training on an operation method of a more advanced level of training than that of the first content in a case in which the user of the vehicle has been trained by the first content and is registered in the server SV.

In step S64, the display control unit TM1 determines whether the viewing of the second content has been completed. If the user has not completed viewing the second content (NO in step S64), the process returns to step S63, and the same process is repeated. If the user is to suspend viewing midway, the display control unit TM1 can store the viewing history and perform display control so that the viewing of the second content can be restarted from the point where the user had suspended the viewing when the viewing is to be restarted.

If it is determined that the user has completed viewing the second content in the determination process of step S64 (YES in step S64), the display control unit TM1 will advance the process to step S65.

In step S65, the determination unit TM2 causes the display unit to display confirmation information for the user to confirm the training contents of the second content, and determines whether the confirmation result from the user is equal to or more than a reference value. As the confirmation information, the determination unit TM2 will display, on the screen, a plurality of choices to be selected as the operation method for an operation case example. A format in which the user selects and inputs a choice which he/she has determined to be correct among the plurality of presented choices is employed, and the user's selection inputs for a plurality of case examples are compiled. The determination unit TM2 determines the understanding of the user who has viewed the second content based on the user's selection inputs. Note that a determination to confirm the training contents can be performed for the first content in the same manner as the determination performed in step S65. In such a case, the determination unit TM2 can perform the same determination process as step S65 after the process of step S61 (after the user has completed viewing the first content).

If it is determined in the determination process of step S65 that the confirmation result is less than the reference value (NO in step S65), the determination unit TM2 returns the process to step S65, and the confirmation determination process is repeated. On the other hand, if it is determined in the determination process of step S65 that the confirmation result is equal to or more than the reference value (YES in step S65), the process will advance to step S66, and the determination unit TM2 will generate the training completion information indicating that the training by the second content has been completed.

Subsequently, in step S67, the communication unit TM3 will transmit the training completion information indicating that the training by the second has been completed to the server SV.

(Procedure of Processing of Server SV)

Figure 7:
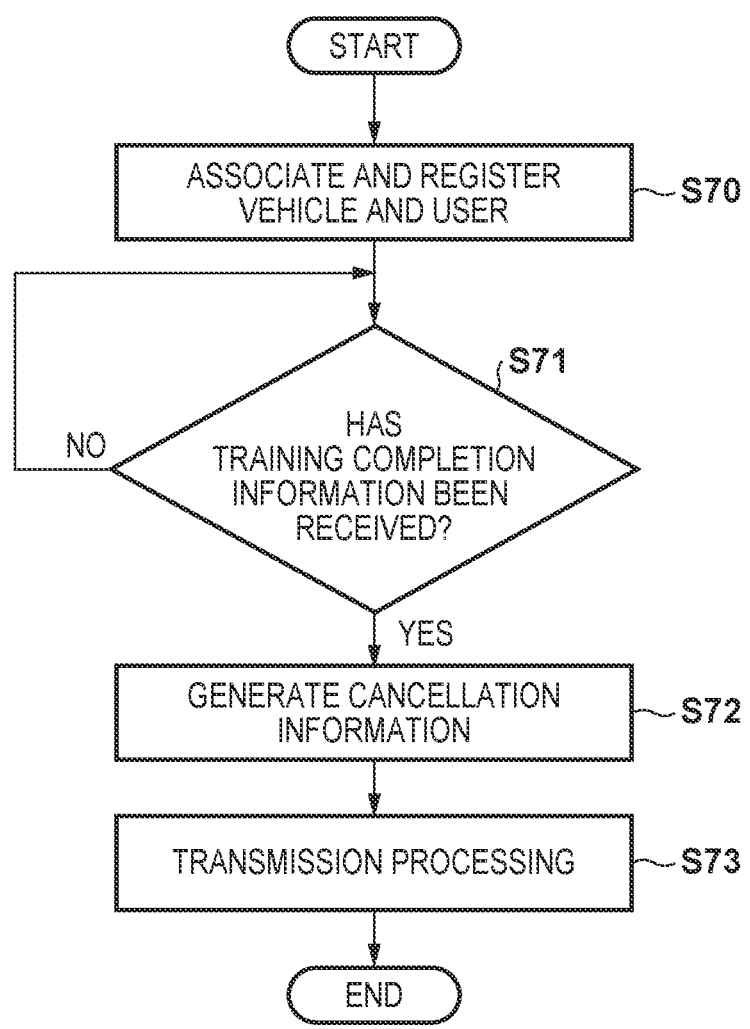
FIG. 7 is a flowchart for explaining a processing procedure of the server.

FIG. 7 is a flowchart for explaining the processing performed in the server SV. In step S70, the information holding unit SV1 of the server SV associates and registers the vehicle and the user who completed the contract to purchase the vehicle 1. The information holding unit SV1 holds information associating the vehicle 1 and the user.

In step S71, the generation unit SV2 of the server SV determines whether it has received the training completion information which indicates that the training by the second content has been completed. If the training completion information has not been received (NO in step S71), the generation unit SV2 waits in a reception standby state. On the other hand, if it is determined in the determination process of step S71 that the training completion information has been received (YES in step S71), the generation unit SV2 will generate, in step S72, the cancellation information for canceling the preset function restriction of the vehicle 1 based on the training completion information.

Subsequently, in step S73, the communication unit SV3 transmits the cancellation information to the vehicle 1 registered in the server SV or the information terminal apparatus TM. In a case in which the cancellation information is received by the information terminal apparatus TM, the communication unit TM3 of the information terminal apparatus TM can transfer the received cancellation information to the vehicle 1.

(Procedure of Processing of Vehicle Control Apparatus 100)

Figure 8:
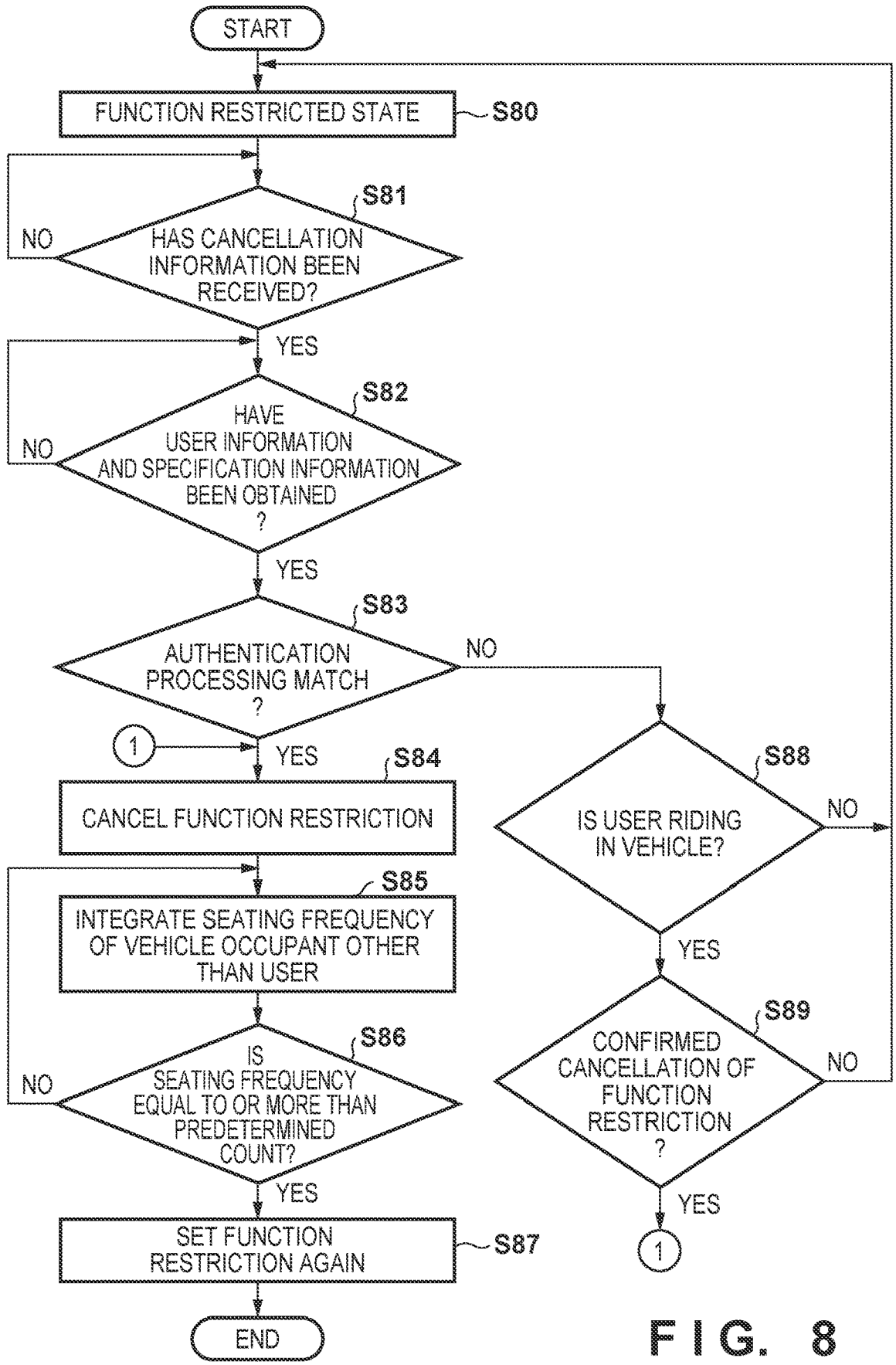
FIG. 8 is a flowchart for explaining a processing procedure of the vehicle control apparatus.

The procedure of processing performed in the vehicle control apparatus 100 will be described next. FIG. 8 is a flowchart for explaining the procedure of processing performed in the vehicle control apparatus 100. In step S80, the vehicle 1 is in a function restricted state. In the state before the cancellation of the function restriction, for example, vehicle control in the first control state can be performed by the vehicle control unit C11, but vehicle control operations in the second control state and the third control state are restricted.

In step S81, the vehicle control unit C11 determines whether the cancellation information has been received. If the cancellation information has not been received (NO in step S81), the vehicle control unit C11 will wait in a cancellation information reception standby state.

On the other hand, if it is determined in the determination process of step S81 that the cancellation information has been received (YES in step S81), the vehicle control unit C11 will advance the process to step S82.

In step S82, the obtainment unit C13 determines whether authentication information for authenticating the user and the user specification information included in the cancellation information have been obtained. If the authentication information and the specification information have not been obtained (NO in step S82), the obtainment unit C13 waits in an authentication information and specification information obtainment standby state.

On the other hand, if it is determined in the determination process of step S82 that the authentication information and the specification information have been obtained (YES in step S82), the obtainment unit C13 will advance the process to step S83.

In step S83, the vehicle control unit C11 performs user authentication processing by comparing the authentication information and the user specification information included in the cancellation information obtained by the obtainment unit C13. If the authentication information and the specification information match, the vehicle control unit C11 will advance the process to step S84.

In step S84, the vehicle control unit C11 cancels, based on the cancellation information, the preset function restriction of the vehicle 1. The vehicle control unit C11 cancels the preset restriction on the functions (the second control state and the third control state) of the vehicle 1, thus enabling vehicle control in the second control state or vehicle control in the third control state to be performed. The vehicle control unit C11 cancels the function restriction on vehicle control in the second control state and the third control state by the function restriction on the vehicle.

Note that in a case in which the vehicle is to start moving from a pre-registered specific position (such as a car dealership where regular vehicle inspection is performed or the like) or in a case in which the occurrence of a failure has been detected in the vehicle when the restriction on the vehicle control function is to be canceled, the vehicle control unit C11 can set exceptions to the cancellation of the function restriction so that restriction on the vehicle control function will be maintained.

The processes of steps S85 to S87 are processes performed when a vehicle occupant other than the user is seated in the driver's seat of the vehicle 1 in which the function restriction has been canceled by the verification (YES in step S83) of user authentication. The processes of steps S88 and S89 are processes performed when the user authentication is not verified in step S83 (NO in step S83).

In step S85, the vehicle control unit C11 integrates the number of times a vehicle occupant who is different from the authenticated user is seated in the driver's seat of the vehicle 1. If the vehicle occupant who is different from the authenticated user is seated in the driver's seat at a predetermined frequency (a predetermined count within a predetermined time), that is, if the seating frequency is equal to or more than the predetermined count (YES in step S86), the vehicle control unit C11 will advance the process to step S87.

On the other hand, if the seating frequency is less than the predetermined count (NO in step S86), the vehicle control unit C11 will return the process to step S85 and repeat the seating frequency integration processing.

In the processes of steps S85 and S86, the vehicle control unit C11 determines whether an integration count, starting from the timing at which the vehicle occupant who is different from the authenticated user has been initially seated in the driver's seat, within a predetermined time is equal to or more than a predetermined count. The integration count is reset after the predetermined time has elapsed. In this case, the vehicle control unit C11 will maintain the state in which the function restriction has been canceled.

On the other hand, in step S87, if it is determined that the vehicle occupant who is different from the authenticated user has been seated on the driver's seat of the vehicle at a predetermined frequency (YES in step S86), the vehicle function whose restriction has been canceled based on the cancellation information will again be restricted by the vehicle control unit C11. That is, the function restriction (on the second control state and the third control state) of the vehicle 1 which was canceled in step S84 is reset again.

Also, if the user authentication is not verified in the authentication processing of step S83 (NO in step S83), the vehicle control unit C11 will advance the process to step S88.

In step S88, the vehicle control unit C11 determines, based on the in-vehicle image information obtained based on the image processing result of the image processing unit C12, whether the authenticated user is riding in the vehicle 1. If the authenticated user is not riding in the vehicle 1 (NO in step S88), the vehicle control unit C11 will maintain the function restriction (step S80).

On the other hand, in the determination process of step S88, if the vehicle control unit C11 determines, based on the image processing result of the image processing unit C12, that the user is seated in the vehicle cabin, but is not seated in the driver's seat of the vehicle 1 (YES in step S88), the process advances to step S89.

In step S89, the vehicle control unit C11 causes an in-vehicle display unit to display a confirmation message to confirm whether the function restriction of the vehicle 1 is to be canceled. If a response to the confirmation message is not input from the input unit (NO in step S89), the vehicle control unit C11 will maintain (step S80) the function restriction of the vehicle 1. If a response to the confirmation message is input from the input unit (YES in step S89), the process advances to step S84 to cancel the function restriction on the vehicle 1 (step S84).

Note that when the function restriction on the vehicle is to be canceled, the vehicle control unit C11 may cause a vehicle display unit to present a plurality of control function items that can be cancelation target items, and cancel the function restriction on the vehicle 1 for each control function item selected from the plurality of control function items.

Second Embodiment

The first embodiment described the arrangement of a vehicle control system STM including information terminal apparatuses TM, a server SV, and a vehicle 1. However, each information terminal apparatus TM can include the functional components of the server SV. For example, an information holding unit SV1, a generation unit SV2, and an information processing unit SV4 included in the server SV may be provided in the information terminal apparatus TM.

In this case, a display control unit TM1 of the information terminal apparatus TM arranged at a car dealership will perform display control to cause a display unit to display a first content that provides training on an operation method including a method to start the operation of a specific function of the vehicle and a second content that provides training, to a user of the vehicle who has already been trained by the first content, on an operation method corresponding a phenomenon that may occur while the specific function is provided. A determination unit TM2 will determine the viewing results of the training contents of the second content based on the inputs from the user. The generation unit SV2 of the information terminal apparatus TM will generate, based on the determination result of the determination unit TM2, the cancellation information for canceling the restriction on a specific function of the vehicle.

As a result, a user who has brought his/her vehicle to a car dealership for a regular vehicle inspection or the like can undergo training on the operation method of a specific function of a vehicle by the processing of the information terminal apparatus TM arranged in the car dealership, and the function restriction on the user's vehicle can be canceled so that vehicle control can be performed on a more advanced control state when the user's understanding of the operation method has reached a predetermined level.

Third Embodiment

The first embodiment described the arrangement of a vehicle control system STM including information terminal apparatuses TM, a server SV, and a vehicle 1, and the second embodiment described a system in which the functional components included in the server SV are provided in the information terminal apparatus TM. However, the functional components of the information terminal apparatus TM and the server SV can be arranged in the vehicle 1.

In this case, a CPU C1 that is in charge of processing related to vehicle control of the vehicle 1 includes, a display control unit TM1, a determination unit TM2, and image capturing processing unit TM4 of the information terminal apparatus TM, and a generation unit SV2 and an information processing unit SV4 of the server SV, and the processing operations of each functional component can be executed under the control of the CPU C1.

The display control unit TM1 of the vehicle 1 performs display control to display, on a display device 92 of the vehicle 1, a first content which provides training on an operation method including a method to start the operation of a specific function of the vehicle, and a second content which provides, to a user of the vehicle who has already been trained by the first content, training on operation methods corresponding phenomena that may occur while the specific function is provided.

Also, the determination unit TM2 of the vehicle 1 will determine the viewing result of the training contents of the second content based on the inputs from the user. The generation unit SV2 of the vehicle 1 will generate, based on the determination result of the determination unit TM2, the cancellation information for canceling the restriction on a specific function of the vehicle.

An in-vehicle monitoring camera 90 of the vehicle 1 can function as an image capturing unit TM6 of the information terminal apparatus TM. A communication device 25a and an ECU 25 can function as communication units (a communication unit TM3 of the information terminal apparatus TM and a communication unit SV3 of the server SV) that exchange information with the outside. In addition, it may be arranged so that an information holding unit SV1 of the server SV will be arranged in an external apparatus, and the communication device 25a and the ECU 25 may refer to the information of the information holding unit SV1.

As a result, the display device 92 of the vehicle 1 can be used to provide training related to the operation of a specific function of the vehicle 1, and the function restriction on the user's vehicle can be canceled so that vehicle control can be performed in a more advanced control state when the user's understanding of the operation method has reached a predetermined level.

Other Embodiments

Several preferred modes according to the present invention have been exemplified above. However, the present invention is not limited to the examples of these modes and may partially be modified without departing from the scope of the invention. For example, other elements may be combined with the contents of each embodiment in accordance with the object, application purpose, and the like, and the contents of a certain embodiment may be combined with part of the contents of another embodiment. In addition, individual terms described in this specification are merely used for the purpose of explaining the present invention, and the present invention is not limited to the strict meanings of the terms and can also incorporate their equivalents.

In addition, a program configured to implement at least one function of the embodiment is supplied to a system or an apparatus via a network or a storage medium, and at least one processor in the computer of the system or the apparatus can read out and execute the program. It is also possible to implement the present invention by such a mode.

Summary of Embodiments

Arrangement 1. There is provided a vehicle control system according to the above-described embodiment which is a vehicle control system (STM) comprising a vehicle (for example, 1 of FIG. 1), an information terminal apparatus (for example, TM of FIGS. 1 and 2) that can provide, on display means, a plurality of contents which provide training on an operation method of the vehicle, and a server (for example, SV of FIGS. 1 and 3) that can communicate with the vehicle and the information terminal apparatus, wherein the information terminal apparatus (TM) comprises display control means (for example, TM1 of FIG. 2) for causing the display means to display a first content that provides training on an operation method including a method to start an operation of a specific function of the vehicle and a second content that provides, to a user of the vehicle who has been trained by the first content and is registered in the server, training on an operation method corresponding to a phenomenon that can occur while the specific function is provided, determination means (for example, TM2 of FIG. 2) for determining a viewing result of the second content based on an input from the user, and transmission means (for example, TM3 of FIG. 2) for transmitting a determination result of the determination means to the server, the server (SV) comprises generation means (for example, SV2 of FIG. 3) for generating, based on the determination result of the determination means, cancellation information for canceling a preset function restriction on the specific function of the vehicle, the vehicle (1) comprises obtainment means (for example, C13 of FIG. 4) for obtaining authentication information for authenticating the user, and vehicle control means (for example, C11 of FIG. 4) for performing authentication processing on the user based on the authentication information, and the vehicle control means (C11) cancels the function restriction on the specific function based on a result of the authentication processing and the cancellation information.

According to the vehicle control system of arrangement 1, training related to an operation method of a specific function of a vehicle can be performed, and function restriction on a user's vehicle can be canceled so that vehicle control can be executed in a more advanced control state when the user's understanding of the operation method has reached a predetermined level.

Also, according to the vehicle control system of arrangement 1, a first content can provide training on operation method used to cause a specific function to operate, and a second content can provide training on an operation method corresponding to a phenomenon that can occur during the operation of the specific function.

Arrangement 2. There is provided the vehicle control system (STM) according to the above-described embodiment, wherein the server (SV) further comprises information holding means (for example, SV1 of FIG. 3) for holding information associating the vehicle and the user, and the display control means (TM1) determines, with respect to the user who has been trained by the first content, whether the user is registered in the server, permits the second content to be displayed to the user who is registered in the server, and restricts the display of the second content to the user who is not registered in the server.

According to the vehicle control system of arrangement 2, it is possible to avoid providing the user with a disproportionate amount of operation methods at once and to sequentially provide the user with training on the operation methods.

Arrangement 3. There is provided the vehicle control system (STM) according to the above-described embodiment, wherein the server (SV) further comprises communication means (for example, SV3 of FIG. 3) for outputting the cancellation information generated by the generation means, and the communication means (SV3) transmits the cancellation information to the vehicle registered in one of the server and the information terminal apparatus.

Arrangement 4. There is provided the vehicle control system (STM) according to the above-described embodiment, wherein the cancellation information includes specification information for specifying the user, and in a case in which the authentication information and the specification information is determined to match in the authentication processing of the user performed by comparing the authentication information obtained by the obtainment means and the specification information included in the cancellation information, the vehicle control means (C11) cancels the function restriction on the specific function based on the cancellation information.

According to the vehicle control system of arrangements 3 and 4, in a case in which the authentication information and the specification information are found to match by the authentication processing of the user, the function restriction on the vehicle can be canceled based on the cancellation information.

Arrangement 5. There is provided the vehicle control system (STM) according to the above-described embodiment, wherein the vehicle control means (C11) determines, based on an image processing result of an image processing unit (for example, C12 of FIG. 4), whether the user is riding in the vehicle, and maintains the function restriction in a case in which the user is not riding in the vehicle.

According to the vehicle control system of arrangement 5, the function restriction can be maintained in a case in which the authenticated user is not riding in the vehicle. That is, the function restriction can be maintained on the driving operation of a vehicle occupant who has not been trained by the first content and the second content and has not reached a predetermined degree of understanding.

Arrangement 6. There is provided the vehicle control system (STM) according to the above-described embodiment, wherein in a case in which the vehicle control means (C11) determines, based on the image processing result, that the user is seated in a cabin of the vehicle but is not seated in a driver's seat of the vehicle, the vehicle control means causes in-vehicle display means to display a confirmation message to confirm whether the function restriction on the specific function is to be canceled.

There may be cases in which the authenticated user will not directly perform the driving operation, but will be able to train the driver on the operation method by giving advice about the operation. According to the vehicle control system of arrangement 6, in a case in which the user is seated in the cabin of the vehicle, but is not seated in the driver's seat of the vehicle, a confirmation message to confirm whether the function restriction on the vehicle is to be canceled can be displayed in advance.

Arrangement 7. There is provided the vehicle control system (STM) according to the above-described embodiment, wherein in a case in which a response to the confirmation message is not input from input means, the vehicle control means (C11) maintains the function restriction on the vehicle, and in a case in which the response to the confirmation message is input from the input means, the vehicle control means cancels the function restriction on the specific function.

According to the vehicle control system of arrangement 7, control can be performed to maintain or cancel the function restriction based on the user's response to the confirmation message.

Arrangement 8. There is provided the vehicle control system (STM) according to the above-described embodiment, wherein the vehicle control means (C11) integrates the number of times a vehicle occupant who is different from the user is seated in the driver's seat of the vehicle, and in a case in which the vehicle occupant who is different from the user is seated in the driver's seat of the vehicle at a predetermined frequency, a function of the vehicle whose restriction has been canceled based on the cancellation information is restricted again by the vehicle control means.

According to the vehicle control system of arrangement 8, since there can be a case in which an unspecified number of vehicle occupants will ride the vehicle depending on the usage of the vehicle, a function of the vehicle whose restriction had been canceled can be restricted again in such a case.

Arrangement 9. There is provided the vehicle control system (STM) according to the above-described embodiment, wherein in a case in which the vehicle is to start moving from a pre-registered specific position or in a case in which an occurrence of a failure has been detected in the vehicle when the function restriction on the specific function is to be canceled, the vehicle control means (C11) maintains the function restriction on the vehicle.

According to the vehicle control system of arrangement 9, the function restriction on the vehicle can be maintained to cope with cases such as a regular vehicle inspection, a vehicle failure, and the like so that the load required to cancel the restriction again will be reduced for the user.

Arrangement 10. There is provided the vehicle control system (STM) according to the above-described embodiment, wherein the vehicle has a first control state in which a driver needs to monitor a periphery and grip a steering wheel, a second control state in which the driver needs to monitor the periphery but need not grip the steering wheel, and a third control state in which the driver needs to neither monitor the periphery nor grip the steering wheel, the vehicle control means (C11) can perform vehicle control in the first control state, and restrict vehicle control in the second control state and the third control state in a state in which the specific function is restricted.

Arrangement 11. There is provided the vehicle control system (STM) according to the above-described embodiment, wherein the vehicle control means (C11) cancels the function restriction on the vehicle control in the second control state and the third control states based on the cancellation of the function restriction on the specific function.

According to the vehicle control system of arrangements 10 and 11, training related to an operation method corresponding to a vehicle control function can be performed, and the function restriction on the user's vehicle can be canceled so that vehicle control can be performed in a more advanced control state when the user's understanding of the operation method has reached a predetermined level.

Arrangement 12. There is provided the vehicle control system (STM) according to the above-described embodiment, wherein when the function restriction on the specific function is to be canceled, the vehicle control means (C11) causes a vehicle display means to display a plurality of control function items that can be cancellation targets, and cancels the function restriction on the specific function for each control function item selected from the plurality of control function items.

According to the vehicle control system of arrangement 12, it is possible to make settings so the function restriction need not be performed uniformly, and the cancellation of the function restriction can be performed in correspondence with the user's driving preference.

Arrangement 13. There is provided the vehicle control system (STM) according to the above-described embodiment, wherein the determination means causes the display means to present confirmation information for confirming the training contents of the second content and determines whether a result of confirmation by the user is not less than a reference value, and in a case in which the result of the confirmation is determined to be not less than the reference value, the transmission means transmits, to the server, training completion information indicating that the training by the second content has been completed.

According to the vehicle control system of arrangement 13, training related to an operation method corresponding to a vehicle control function can be performed, and the function restriction on the user's vehicle can be canceled so that vehicle control can be performed in a more advanced control state when the user's understanding of the operation method has reached a predetermined level.

Arrangement 14. There is provided the vehicle control system (STM) according to the above-described embodiment, wherein the information terminal apparatus further comprises image capturing means for capturing an image of the user viewing the plurality of contents, and image capturing processing means for processing an image captured by the image capturing means, and the image capturing processing means obtains image information of the user by processing the image captured by the image capturing means, and in a case in which a degree of alertness of the user obtained from the image information is not less than a predetermined threshold, the determination means determines that the user has viewed the second content under a predetermined degree of alertness, and in a case in which it is determined that the second content has been viewed by the user under the predetermined degree of alertness, the transmission means transmits, to the server, training completion information indicating that the training by the second content has been completed.

According to the vehicle control system of arrangement 14, training related to an operation method corresponding to a vehicle control function can be performed, and the restriction on the user's vehicle can be canceled so that vehicle control can be executed in a more advanced control state when the user has viewed the second content under a predetermined degree of alertness.

Arrangement 15. There is provided a vehicle control system according to the above-described embodiment which is a vehicle control system (STM) comprising a vehicle (for example, 1 of FIG. 1) and an information terminal apparatus (for example, TM of FIGS. 1 and 2) which can provide, to display means, a plurality of contents that provide training on an operation method of the vehicle, wherein the information terminal apparatus (TM) comprises display control means (for example, TM1 of FIG. 2) for causing the display means to display a first content that provides training on an operation method including a method to start an operation of a specific function of the vehicle and a second content that provides, to a user of the vehicle who has been trained by the first content, training on an operation method corresponding to a phenomenon that can occur while the specific function is provided, determination means (for example, TM2 of FIG. 2) for determining a viewing result of the second content based on an input from the user, and generation means (for example, SV2 of FIG. 3) for generating, based on a determination result of the determination means, cancellation information for canceling a preset function restriction on the specific function of the vehicle, the vehicle (1) comprises obtainment means (for example, C13 of FIG. 4) for obtaining authentication information for authenticating the user, and vehicle control means (for example, C11 of FIG. 4) for performing authentication processing on the user based on the authentication information, and the vehicle control means (C11) cancels the function restriction on the specific function based on a result of the authentication processing and the cancellation information.

According to the vehicle control system of arrangement 15, training related to an operation method of a specific function of a vehicle can be performed, and the function restriction on the user's vehicle can be canceled so that vehicle control can be executed in a more advanced control state when the user's understanding of the operation method has reached a predetermined level.

Arrangement 16. There is provided a vehicle according to the above-described embodiment which is a vehicle comprising:

display control means (for example, TM1 of FIG. 2) for causing a display means to display a first content that provides training on an operation method including a method to start an operation of a specific function of the vehicle and a second content that provides, to a user of the vehicle who has been trained by the first content, training on an operation method corresponding to a phenomenon that can occur while the specific function is provided, determination means (for example, TM2 of FIG. 2) for determining a viewing result of the second content based on an input from the user, generation means (for example, SV2 of FIG. 3) for generating, based on a determination result of the determination means, cancellation information for canceling a preset function restriction on the specific function of the vehicle, obtainment means (for example, C13 of FIG. 4) for obtaining authentication information for authenticating the user, and vehicle control means (for example, C11 of FIG. 4) for performing authentication processing on the user based on the authentication information, wherein the vehicle control means (C11) cancels the function restriction on the specific function based on a result of the authentication processing and the cancellation information.

According to the vehicle of arrangement 16, training related to an operation method of a specific function of a vehicle can be performed, and the function restriction on the user's vehicle can be canceled so that vehicle control can be executed in a more advanced control state when the user's understanding of the operation method has reached a predetermined level.

The invention is not limited to the foregoing embodiments, and various variations/changes are possible within the spirit of the invention.

What is claimed is:

1. A vehicle control system comprising a vehicle, an information terminal apparatus that can provide, on a display, a plurality of contents which provide training on an operation method of the vehicle, and a server that can communicate with the vehicle and the information terminal apparatus,
   wherein the information terminal apparatus comprises at least one first processor circuit with a first memory comprising first instructions, that when executed by the at least one first processor circuit, cause the at least one first processor circuit to at least:
   display a first content that provides training on an operation method including a method to start an operation of an automated driving control function of the vehicle and a second content that provides, to a user of the vehicle who has been trained by the first content and is registered in the server, training on an operation method corresponding to a phenomenon that can occur while the automated driving control function is provided,
   determine a viewing result of the second content based on an input from the user, and
   transmit a determination result of the determination to the server,
   the server comprises at least one second processor circuit with a second memory comprising second instructions, that when executed by the second processor circuit, cause the at least one second processor circuit to at least:
   generate, based on the determination result of the determination, cancellation information for canceling a preset function restriction on the automated driving control function of the vehicle,
   the vehicle comprises at least one third processor circuit with a third memory comprising third instructions, that when executed by the third processor circuit, cause the at least one third processor circuit to at least:
   obtain authentication information for authenticating the user, and
   perform authentication processing on the user based on the authentication information, and
   the third instructions further cause the at least one third processor circuit to at least cancel the function restriction on the automated driving control function based on a result of the authentication processing and the cancellation information, and
   in a case in which a vehicle occupant who is different from the user is seated in a driver's seat of the vehicle, a function of the vehicle whose restriction has been canceled based on the cancellation information is restricted again by the instructions.

2. The system according to claim 1, wherein
the second instructions further cause the at least one second processor circuit to at least hold information associating the vehicle and the user, and
the first instructions further cause the at least one first processor circuit to at least determine, with respect to the user who has been trained by the first content, whether the user is registered in the server, permit the second content to be displayed to the user who is registered in the server, and restrict the display of the second content to the user who is not registered in the server.

3. The system according to claim 1, wherein
the second instructions further cause the at least one second processor circuit to at least output the cancellation information, and
transmit the cancellation information to the vehicle registered in one of the server and the information terminal apparatus.

4. The system according to claim 3, wherein the cancellation information includes specification information for specifying the user, and
in a case in which the authentication information and the specification information are determined to match in the authentication processing of the user performed by comparing the authentication information and the specification information included in the cancellation information, the function restriction on the automated driving control function is canceled based on the cancellation information.

5. The system according to claim 4, wherein the third instructions further cause the at least one third processor circuit to at least determine, based on an image processing result of an image processing unit, whether the user is riding in the vehicle, and maintain the function restriction in a case in which the user is not riding in the vehicle.

6. The system according to claim 5, wherein in a case in which it is determined, based on the image processing result, that the user is seated in a cabin of the vehicle but is not seated in a driver's seat of the vehicle, the third instructions further cause the at least one third processor circuit to at least cause an in-vehicle display unit to display a confirmation message to confirm whether the function restriction on the automated driving control function is to be canceled.

7. The system according to claim 6, wherein in a case in which a response to the confirmation message is not input from an input unit, the third instructions further cause the at least one third processor circuit to at least maintain the function restriction on the vehicle, and
in a case in which the response to the confirmation message is input from the input unit, the third instructions further cause the at least one third processor circuit to at least cancel the function restriction on the automated driving control function.

8. The system according to claim 6, wherein the third instructions further cause the at least one third processor circuit to at least integrate a number of times a vehicle occupant who is different from the user is seated in the driver's seat of the vehicle, and in a case in which the vehicle occupant who is different from the user is seated in the driver's seat of the vehicle at a predetermined frequency, a function of the vehicle whose restriction has been canceled based on the cancellation information is restricted again.

9. The system according to claim 1, wherein in a case in which the vehicle is to start moving from a pre-registered specific position or in a case in which an occurrence of a failure has been detected in the vehicle when the function restriction on the automated driving control function is to be canceled, the third instructions further cause the at least one third processor circuit to at least maintain the function restriction on the vehicle.

10. The system according to claim 1, wherein the vehicle has a first control state in which a driver needs to monitor a periphery and grip a steering wheel,
a second control state in which the driver needs to monitor the periphery but need not grip the steering wheel, and
a third control state in which the driver neither needs to monitor the periphery nor grip the steering wheel,
the third instructions further cause the at least one third processor circuit to at least perform vehicle control in the first control state, and restrict vehicle control in the second control state and the third control state in a state in which the automated driving control function is restricted.

11. The system according to claim 10, wherein the third instructions further cause the at least one third processor circuit to at least cancel the function restriction on the vehicle control in the second control state and the third control state based on the cancellation of the function restriction on the automated driving control function.

12. The system according to claim 1, wherein when the function restriction on the automated driving control function is to be canceled, a plurality of control function items that can be cancellation targets are displayed, and the function restriction on the automated driving control function is canceled for each control function item selected from the plurality of control function items.

13. The system according to claim 1, wherein the confirmation information is presented for confirming the training contents of the second content and determining whether a result of confirmation by the user is not less than a reference value, and
in a case in which the result of the confirmation is determined to be not less than the reference value, the first instructions further cause the at least one first processor circuit to at least transmit, to the server, training completion information indicating that the training by the second content has been completed.

14. The system according to claim 1, wherein the information terminal apparatus further comprises an image capturing unit configured to capture an image of the user viewing the plurality of contents, and
an image capturing processor configured to process an image captured by the image capturing unit, and
the image capturing processor obtains image information of the user by processing the image captured by the image capturing unit, and
in a case in which a degree of alertness of the user obtained from the image information is not less than a predetermined threshold, the first instructions further cause the at least one first processor circuit to at least determine the user has viewed the second content under a predetermined degree of alertness, and
in a case in which it is determined that the second content has been viewed by the user under the predetermined degree of alertness, the first instructions further cause the at least one first processor circuit to at least transmit, to the server, training completion information indicating that the training by the second content has been completed.

15. A vehicle control system comprising a vehicle and an information terminal apparatus which can provide, to a display, a plurality of contents that provide training on an operation method of the vehicle,
wherein the information terminal apparatus comprises at least one processor circuit with a memory comprising instructions, that when executed by the processor circuit, cause the at least one processor circuit to at least:
display a first content that provides training on an operation method including a method to start an operation of an automated driving control function of the vehicle and a second content that provides, to a user of the vehicle who has been trained by the first content, training on an operation method corresponding to a phenomenon that can occur while the automated driving control function is provided,
determine a viewing result of the second content based on an input from the user, and
generate, based on a determination result of the determination, cancellation information for canceling a preset function restriction on the automated driving control function of the vehicle,
the vehicle comprises at least one processor circuit with a memory comprising instructions, that when executed by the processor circuit, cause the at least one processor circuit to at least:
obtain authentication information for authenticating the user, and
perform authentication processing on the user based on the authentication information, and
the instructions further cause the at least one processor circuit to at least cancel the function restriction on the automated driving control predefined function based on a result of the authentication processing and the cancellation information,
in a case in which a vehicle occupant who is different from the user is seated in a drivers seat of the vehicle, a function of the vehicle whose restriction has been canceled based on the cancellation information is restricted again by the instructions.

16. A vehicle comprising:
at least one processor circuit with a memory comprising instructions, that when executed by the processor circuit, cause the at least one processor circuit to at least:
display a first content that provides training on an operation method including a method to start an operation of an automated driving control function of the vehicle and a second content that provides, to a user of the vehicle who has been trained by the first content, training on an operation method corresponding to a phenomenon that can occur while the automated driving control function is provided,
determine a viewing result of the second content based on an input from the user,
generate, based on a determination result of the determination, cancellation information for canceling a preset function restriction on the automated driving control function of the vehicle,
obtain authentication information for authenticating the user, and
perform authentication processing on the user based on the authentication information,
wherein the instructions further cause the at least one processor circuit to at least cancel the function restriction on the automated driving control function based on a result of the authentication processing and the cancellation information, and
in a case in which a vehicle occupant who is different from the user is seated in a drivers seat of the vehicle, a function of the vehicle whose restriction has been canceled based on the cancellation information is restricted again by the instructions.

* * * * *